(12) United States Patent
Barsness et al.

(10) Patent No.: US 9,720,802 B2
(45) Date of Patent: *Aug. 1, 2017

(54) BREAKPOINT FOR PREDICTED TUPLE PROCESSING TIME IN A STREAMING ENVIRONMENT

(71) Applicant: International Business Machines Corporation, Armonk, NY (US)

(72) Inventors: Eric L. Barsness, Pine Island, MN (US); Michael J. Branson, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/333,543

(22) Filed: Oct. 25, 2016

(65) Prior Publication Data

US 2017/0139804 A1 May 18, 2017

Related U.S. Application Data

(63) Continuation of application No. 15/213,567, filed on Jul. 19, 2016, now Pat. No. 9,563,537, which is a
(Continued)

(51) Int. Cl.
*G06F 9/44* (2006.01)
*G06F 11/36* (2006.01)
(Continued)

(52) U.S. Cl.
CPC .............. *G06F 11/362* (2013.01); *G06F 8/41* (2013.01); *G06F 17/3056* (2013.01)

(58) Field of Classification Search
CPC . G06F 11/1407; G06F 11/362; G06F 17/3056
(Continued)

(56) References Cited

U.S. PATENT DOCUMENTS 7,219,333 B2    5/2007  Agarwala et al.
7,620,802 B2 * 11/2009  Takuma .............. G06F 11/3648
                                                        712/227
(Continued)

OTHER PUBLICATIONS

Debugging Tools and Strategies for Distributed Stream Processing Applications—Bugra Gedik, Henrique Andrade, Andy Frenkiel, Wim De Pauw, Norman Cohen, Kun-Lung Wu—IBM Research—Michael Pfeifer, Paul Allen—IBM Software Group—Softwareipractice and Experience Softw. Pract. Exper. 2010.*
(Continued)

*Primary Examiner* — Francisco Aponte
(74) *Attorney, Agent, or Firm* — Scott S. Dobson

(57) ABSTRACT

A stream of tuples is received to be processed by processing elements operating on one or more computer processors with each processing element having one or more stream operators. A breakpoint is identified for a stream operator that is configured to be triggered when time for processing of a tuple by the first stream operator is predicted to exceed a threshold time. A tuple is received at the stream operator having a set of attributes. A predicted time to process the tuple is determined based on the set of attributes. It is determined that the predicted time exceeds the threshold time. The breakpoint is triggered, in response to determining that the predicted time exceeds the threshold time, to pause processing of the tuple by the first stream operator.

1 Claim, 7 Drawing Sheets

Related U.S. Application Data continuation of application No. 14/939,026, filed on Nov. 12, 2015.

(51) Int. Cl.
*G06F 9/45* (2006.01)
*G06F 17/30* (2006.01)

(58) Field of Classification Search
USPC .......................................................... 717/129
See application file for complete search history.

(56) References Cited

U.S. PATENT DOCUMENTS

| | | | |
|---|---|---|---|
| 7,992,133 B1 | 8/2011 | Theroux et al. | |
| 8,245,212 B2* | 8/2012 | Steiner | G06F 11/3636 717/129 |
| 8,289,335 B2* | 10/2012 | Hansen | G06F 9/30098 345/522 |
| 8,307,346 B2* | 11/2012 | Lev | G06F 11/3632 717/131 |
| 8,572,274 B2 | 10/2013 | Barsness et al. | |
| 8,621,435 B2* | 12/2013 | Aharoni | G06F 8/74 717/125 |
| 8,924,939 B2 | 12/2014 | Branson et al. | |
| 8,924,940 B2* | 12/2014 | Branson | G06F 11/362 717/127 |
| 8,990,784 B2* | 3/2015 | Anton | G06F 11/3466 717/131 |
| 9,020,785 B2 | 4/2015 | Branson et al. | |
| 9,110,682 B2* | 8/2015 | Cao | G06F 9/444 |
| 9,135,145 B2* | 9/2015 | Voccio | G06F 11/3612 |
| 9,164,871 B2* | 10/2015 | Bates | G06F 11/3636 |
| 9,372,780 B2* | 6/2016 | Barsness | G06F 11/3636 |
| 9,454,458 B2 | 9/2016 | Branson et al. | |
| 9,563,537 B1 | 2/2017 | Barsness et al. | |
| 2003/0115576 A1 | 6/2003 | Bates et al. | |
| 2004/0153818 A1 | 8/2004 | Woodall | |
| 2007/0168972 A1 | 7/2007 | Bates et al. | |
| 2010/0153653 A1 | 6/2010 | El-Mahdy et al. | |
| 2011/0178775 A1 | 7/2011 | Schoning et al. | |
| 2012/0110553 A1* | 5/2012 | Bates | G06F 11/3624 717/129 |
| 2012/0137178 A1 | 5/2012 | Barsness et al. | |
| 2012/0254666 A1* | 10/2012 | Liu | G06F 11/3636 714/34 |
| 2013/0014088 A1* | 1/2013 | Park | G06F 11/3636 717/128 |
| 2013/0080653 A1 | 3/2013 | Santosuosso et al. | |
| 2013/0080655 A1 | 3/2013 | Barsness et al. | |
| 2013/0179585 A1 | 7/2013 | Branson et al. | |
| 2013/0305227 A1 | 11/2013 | Branson et al. | |
| 2013/0318504 A1* | 11/2013 | Eker | G06F 11/3636 717/128 |
| 2014/0136175 A1 | 5/2014 | Branson et al. | |
| 2014/0317602 A1* | 10/2014 | Zuo | G06F 11/362 717/125 |
| 2015/0007144 A1 | 1/2015 | Barsness et al. | |
| 2015/0347274 A1* | 12/2015 | Taylor | G06F 11/362 717/125 |
| 2015/0378870 A1* | 12/2015 | Marron | G06F 11/362 717/128 |
| 2016/0092345 A1 | 3/2016 | Branson et al. | |
| 2016/0259704 A1* | 9/2016 | Barsness | G06F 11/3466 |
| 2016/0259705 A1* | 9/2016 | Barsness | G06F 11/3466 |
| 2016/0328450 A1 | 11/2016 | Branson et al. | |
| 2016/0328464 A1 | 11/2016 | Branson et al. | |

OTHER PUBLICATIONS

Visual Debugging for Stream Processing Applications—Wim De Pauw, Mihai Lenia, Bugra Gedik, Henrique Andrade*, Andy Frenkiel, Michael Pfeifer, and Daby Sow—IBM T.J. Watson Research Center—RV 2010, LNCS 6418, pp. 18-35, 2010.*

List of IBM Patents or Patent Applications Treated as Related, dated Mar. 15, 2017, pp. 1-2.

Barsness et al., "Breakpoint for Predicted Tuple Processing Time in a Streaming Environment", U.S. Appl. No. 14/939,026, filed Nov. 12, 2015.

Barsness et al., "Breakpoint for Predicted Tuple Processing Time in a Streaming Environment", U.S. Appl. No. 15/333,564, filed Oct. 25, 2016.

* cited by examiner

BREAKPOINT FOR PREDICTED TUPLE PROCESSING TIME IN A STREAMING ENVIRONMENT

BACKGROUND

The present disclosure relates generally to the field of stream computing, and more particularly to computing applications that receive streaming data and process the data as it is received.

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

SUMMARY

Embodiments of the disclosure provide a method, system, and computer program product for processing data. The method, system, and computer program product receive two or more tuples to be processed by a plurality of processing elements operating on one or more computer processors.

Embodiments of the present disclosure provide a method for processing a stream of tuples. The method includes receiving a stream of tuples to be processed by processing elements operating on one or more computer processors with each processing element having one or more stream operators. The method further includes identifying a breakpoint for a first stream operator that is configured to be triggered when time for processing of a tuple by the first stream operator is predicted to exceed a threshold time. The method further includes receiving, at the first stream operator, a tuple having a set of attributes. The method further includes determining, based on the set of attributes, a predicted time to process the tuple. The method further includes determining the predicted time exceeds the threshold time. The method further includes triggering the breakpoint, in response to determining the predicted time exceeds the threshold time, to pause processing of the tuple by the first stream operator.

Additional embodiments of the present disclosure are directed to a system and a computer program product configured to perform the method disclosed herein.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present invention and, along with the description, serve to explain the principles of the invention. The drawings are only illustrative of typical embodiments of the invention and do not limit the invention.

DETAILED DESCRIPTION

Figure 1:
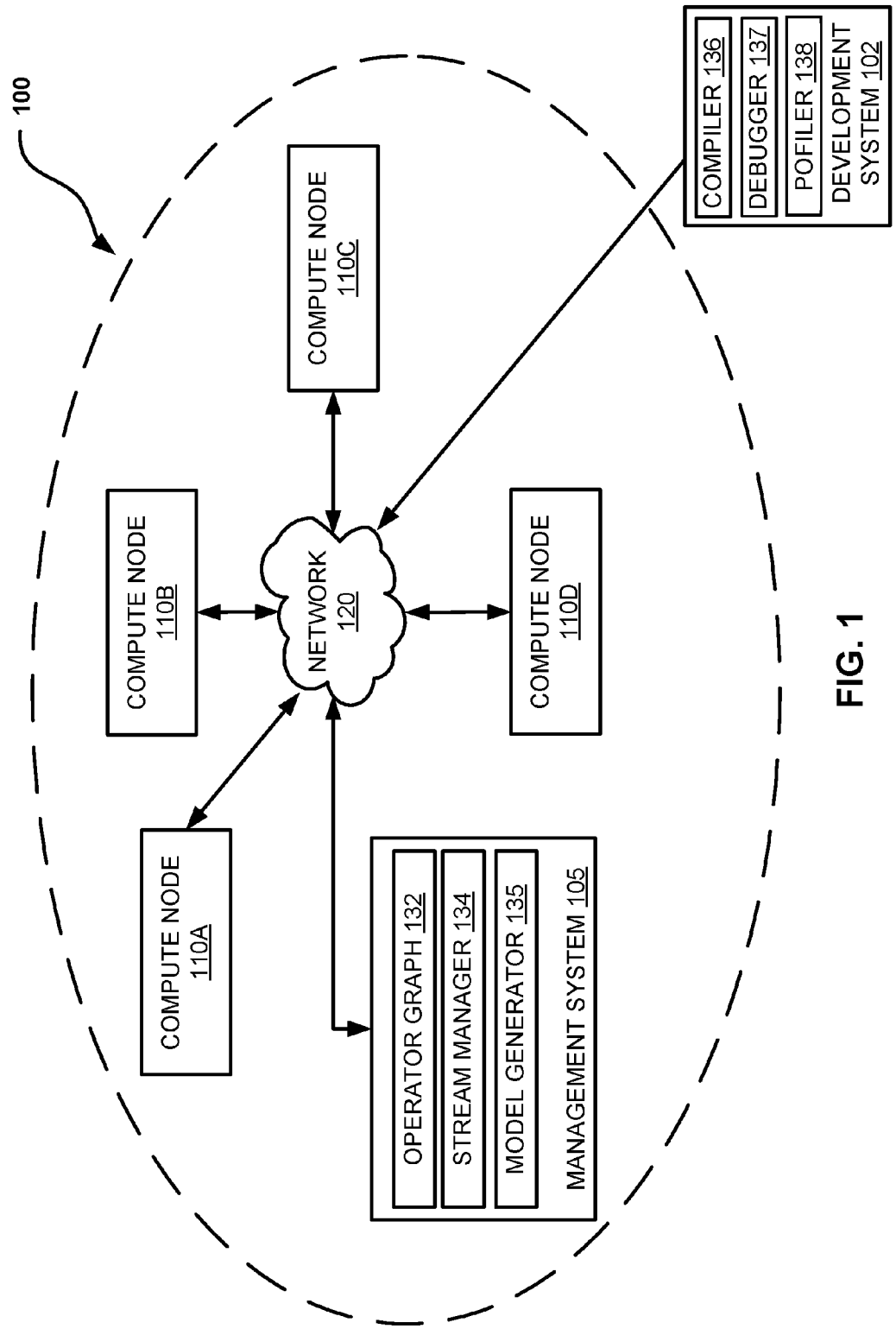
FIG. 1 illustrates a computing infrastructure configured to execute a stream computing application according to various embodiments.

The present disclosure relates to stream computing, and in particular, to computing applications that receive streaming data and process the data as it is received. While the present disclosure is not necessarily limited to such applications, various aspects of the disclosure may be appreciated through a discussion of various examples using this context.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. A particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed in some way from the input tuple.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

An operator graph can be an execution path for a plurality of stream operators to process a stream of tuples. In addition to stream operators, the operator graph can refer to an execution path for processing elements and the dependent stream operators of the processing elements to process the stream of tuples. Generally, the operator graph can have a plurality of stream operators that produce a particular end result, e.g., calculate an average.

Embodiments of the present disclosure may provide for breakpoints at one or more stream operators that trigger when it is predicted that it will to take a long time to process the tuple by the respective stream operator. A user may be able to set up a breakpoint for a given stream operator through a development environment such as, for example, an integrated development environment (IDE) with a debugger. When it is predicted that a tuple will take a long time to process, the breakpoint is triggered and the processing of the tuple by the associated stream operator is paused. Additionally, some or all of the other operators in the operator graph may be paused. Triggering the breakpoint also allows a developer to use a debugger to examine the code of the stream operator. The debugger may also allow the developer to execute the stream operator code step-by-step as it processes the tuple to determine the reasons for the slow processing and to develop optimizations to speed up processing of the tuple and other tuples with similar attributes.

The user may be able to define a threshold time, through a development environment, that is used to determine if the predicted processing time for a tuple triggers the breakpoint. The code implementing the breakpoint may be configured to, when executed, predict a processing time for an incoming tuple and compare this time to the threshold time and trigger the breakpoint if the predicted processing time exceeds the threshold time.

Historical data may be stored that contains data from past processing tuples at one or more stream operators. A user may be able to select the one or more stream operators for monitoring and storing data for processing of tuples through a development environment. The historical data stored may include, for example, the processing time, tuple attributes, and system performance characteristics for each processing of a tuple by one or more stream operators. System performance characteristics may include utilization percentages of compute node resources such as, for example, CPU utilization.

A model can then be generated based on the historical data. The model may be used to predict the processing time for a given tuple at a stream operator based on the historical data. In a simple form, the model may look at a specific attribute of a given tuple provide a predicted processing time based on previous processing times on tuples with similar attributes. In some embodiments, the model will take into account multiple attributes and the predicted processing time is based on the combination of attributes. The model may take into account any attributes of a tuple that affect processing time of the tuple. For example, an attribute may be an individual value in the tuple. In another example, an attribute may be based on an aggregate state of all or some set of the values of the tuple.

Example attributes of a tuple that could cause an increased processing time include: a long string field where the operator performs text processing on the string field; a flag with a specified value that turns on additional processing in the operator; a field containing data where the field is typically null such that the data needs extra processing; or a high integer attribute where the integer attribute represents the number of times the operator will perform an operation. These are examples only and are not meant to be limiting, as there are many other possible attributes that could cause an increased processing time in accordance with embodiments of the present disclosure.

FIG. 1 illustrates one exemplary computing infrastructure 100 that may be configured to execute a stream computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A development system 102 may be communicatively coupled with the management system 105 and the compute nodes 110 either directly or via the communications network 120.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
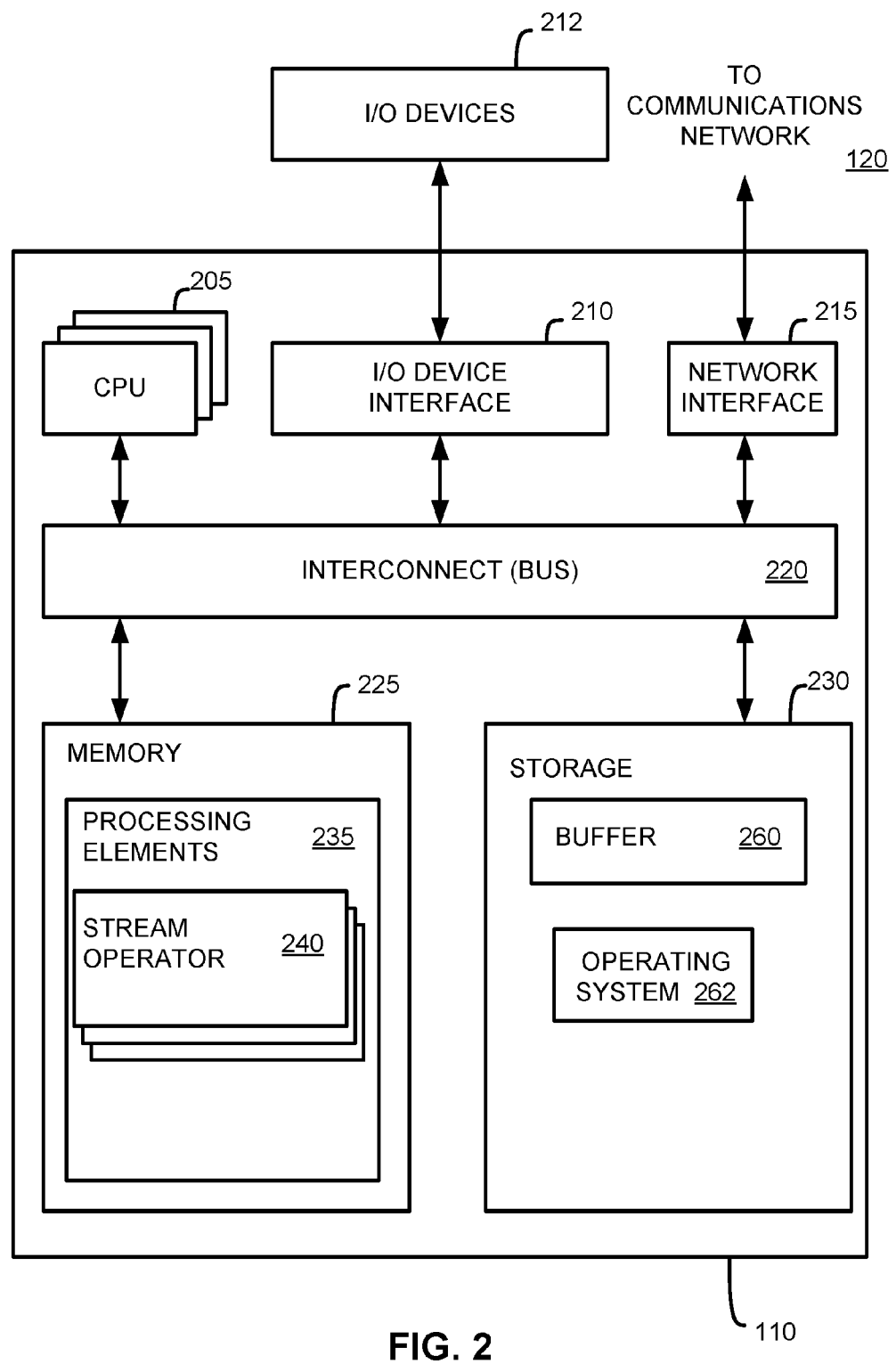
FIG. 2 illustrates a more detailed view of a compute node of FIG. 1 according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. Two or more processing elements 235 may run on the same memory 225, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

Figure 3:
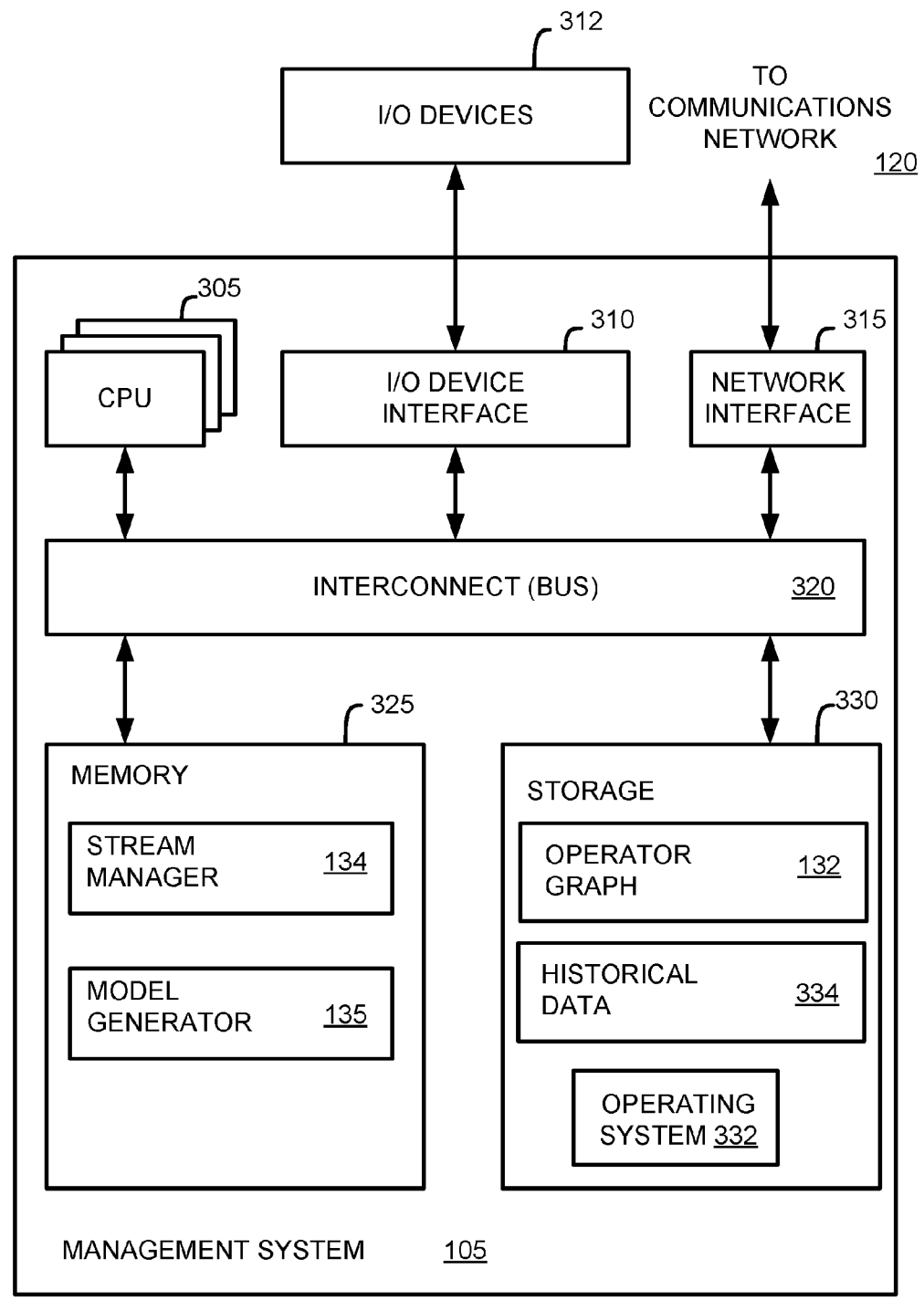
FIG. 3 illustrates a more detailed view of the management system of FIG. 1 according to various embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134 and a model generator 135. Additionally, the storage 330 may store an operator graph 335 and historical data 334. The operator graph 335 may define how tuples are routed to processing elements 235 (FIG. 2) for processing.

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
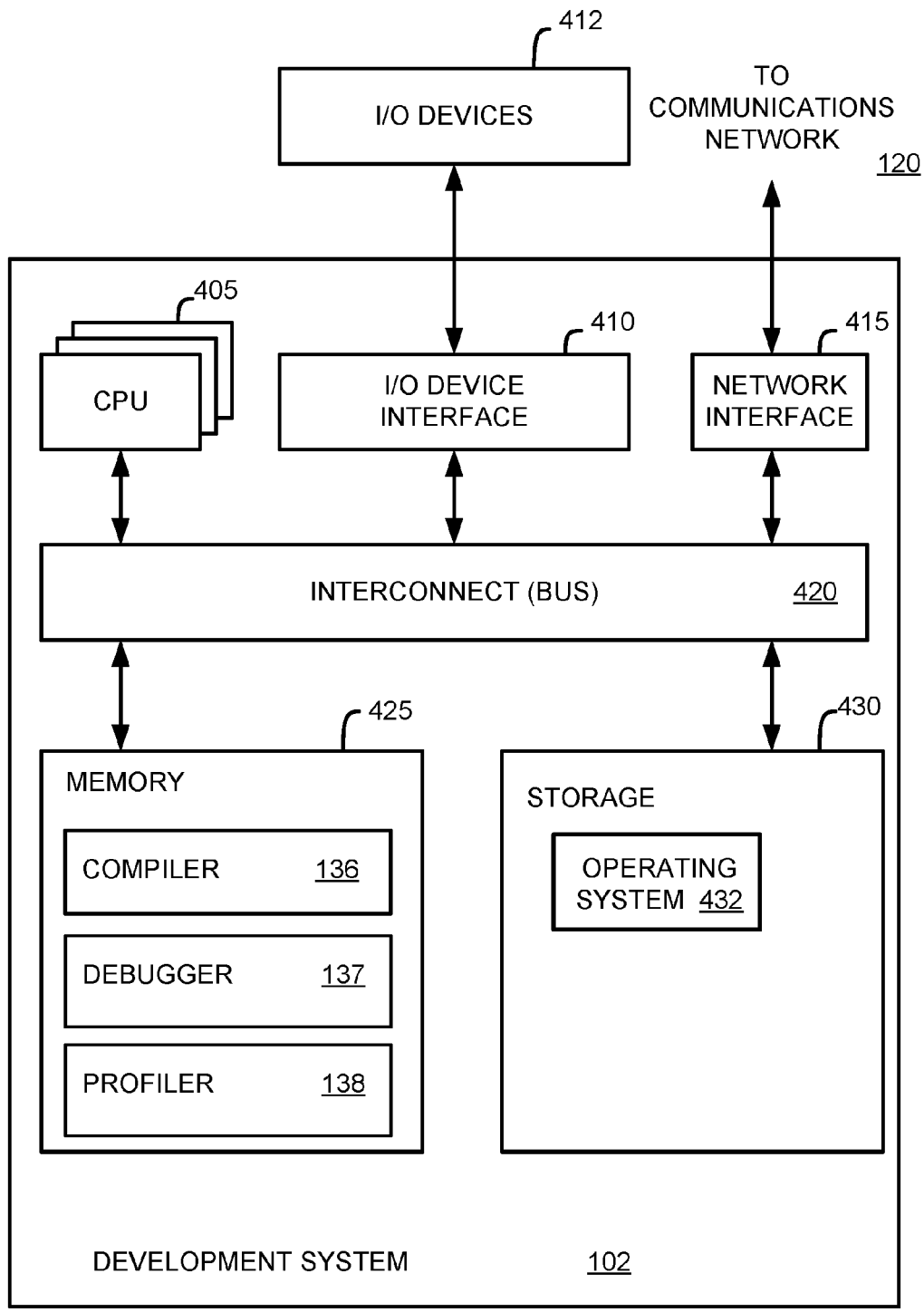
FIG. 4 illustrates a more detailed view of the development system of FIG. 1 according to various embodiments.

FIG. 4 is a more detailed view of the development system 102 of FIG. 1 according to some embodiments. The development system 102 may include, without limitation, one or more processors (CPUs) 405, a network interface 415, an interconnect 420, a memory 425, and storage 430. The development system 102 may also include an I/O device interface 410 connecting I/O devices 412, e.g., keyboard, display, and mouse devices, to the development system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The development system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 132 of FIG. 1.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

The memory 425 may further store a debugger 137. The debugger 137 may be a distinct application for debugging a streaming application or may be part of an IDE. The debugger 137 may provide any of the functionality of a typical debugger. The debugger 137 may be configured to allow a user to enter one or more breakpoints for one or more stream operators that are configured to trigger when a tuple is predicted to take a long time to process by the respective stream operator. The debugger 137 may communicate the breakpoints to the stream manager 134. The stream manager 134 may be configured to activate code for a given stream operator in the operator graph 132 to be executed to implement the breakpoint prior to executing the normal stream operator code for each tuple. The stream manager 134 may also provide a model for predicting the processing time of each tuple, generated by model generator 135, to be used when executing the code implementing the breakpoint. The code implementing the breakpoint may be configured to, when executed, perform at least part of the method 600 as depicted FIG. 6.

The memory 425 may further store a profiler 138. The profiler 138 may be configured to perform profiling on stream operator code to identify a portion of the stream operator code which is executing slowly. In some embodiments, the profiler 138 may be tool of debugger 137. In some embodiments, the compiler 136, debugger 137, and profiler 138 may be part of an IDE.

Figure 5:
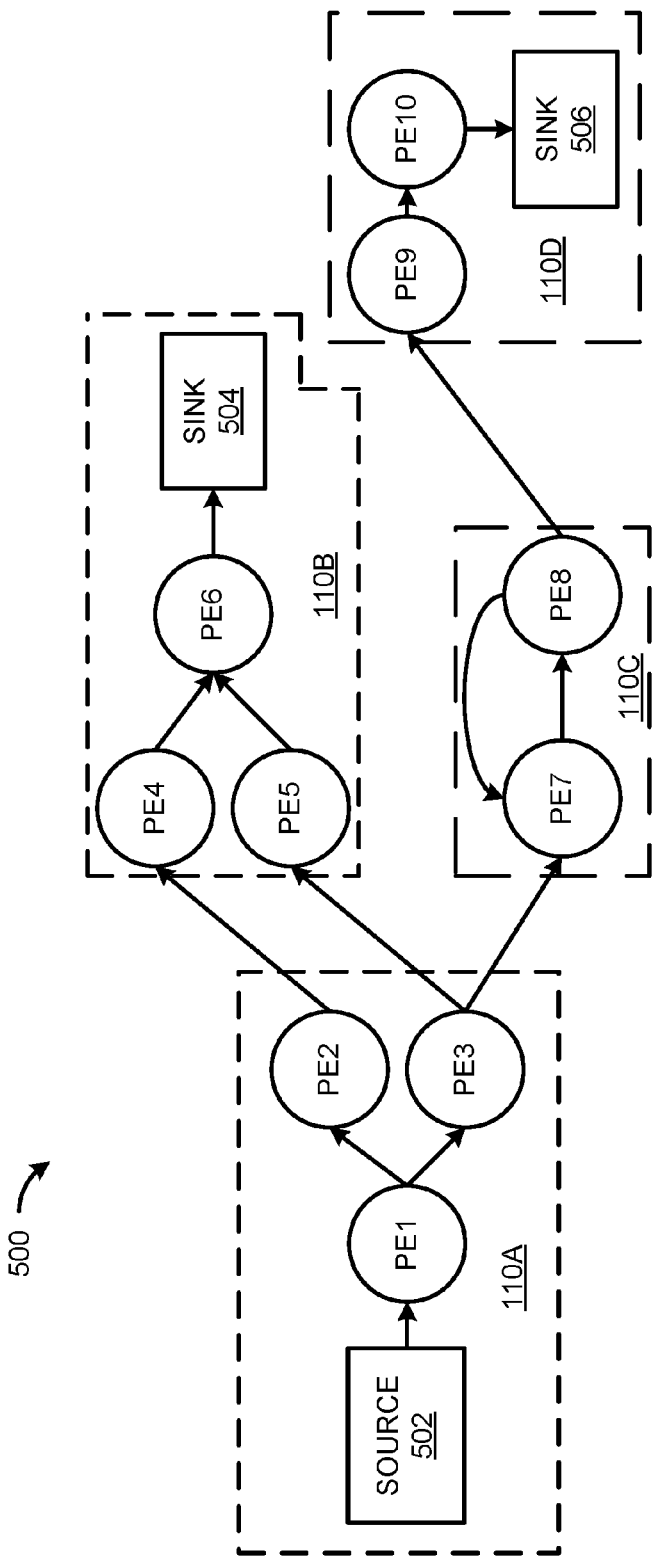
FIG. 5 illustrates an operator graph for a stream computing application according to various embodiments.

FIG. 5 illustrates an exemplary operator graph 500 for a stream computing application beginning from one or more sources 502 through to one or more sinks 504, 506, according to some embodiments. This flow from source to sink may also be generally referred to herein as an execution path. In addition, a flow from one processing element to another may be referred to as an execution path in various contexts. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 502 and ends at a sink 504, 506. Compute node 110A includes the processing elements PE1, PE2, and PE3. Source 502 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

The tuple received by a particular processing element 235 (FIG. 2) is generally not considered to be the same tuple that is output downstream. Typically, the output tuple is changed in some way. An attribute or metadata may be added, deleted, or changed. However, it is not required that the output tuple be changed in some way. Generally, a particular tuple output by a processing element may not be considered to be the same tuple as a corresponding input tuple even if the input tuple is not changed by the processing element. However, to simplify the present description and the claims, an output tuple that has the same data attributes as a corresponding input tuple may be referred to herein as the same tuple.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

As discussed herein, stream manager 134 may also be configured to activate code within the operator graph to implement breakpoints for one or more stream operators. Further, stream manager 134 may be configured to store historical tuple processing times along with corresponding tuple attributes and system performance characteristics for one or more stream operators as it monitors the stream computing application running on the compute nodes. This data may be stored, for example, as historical data 334 in storage 330 as depicted in FIG. 3.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6:
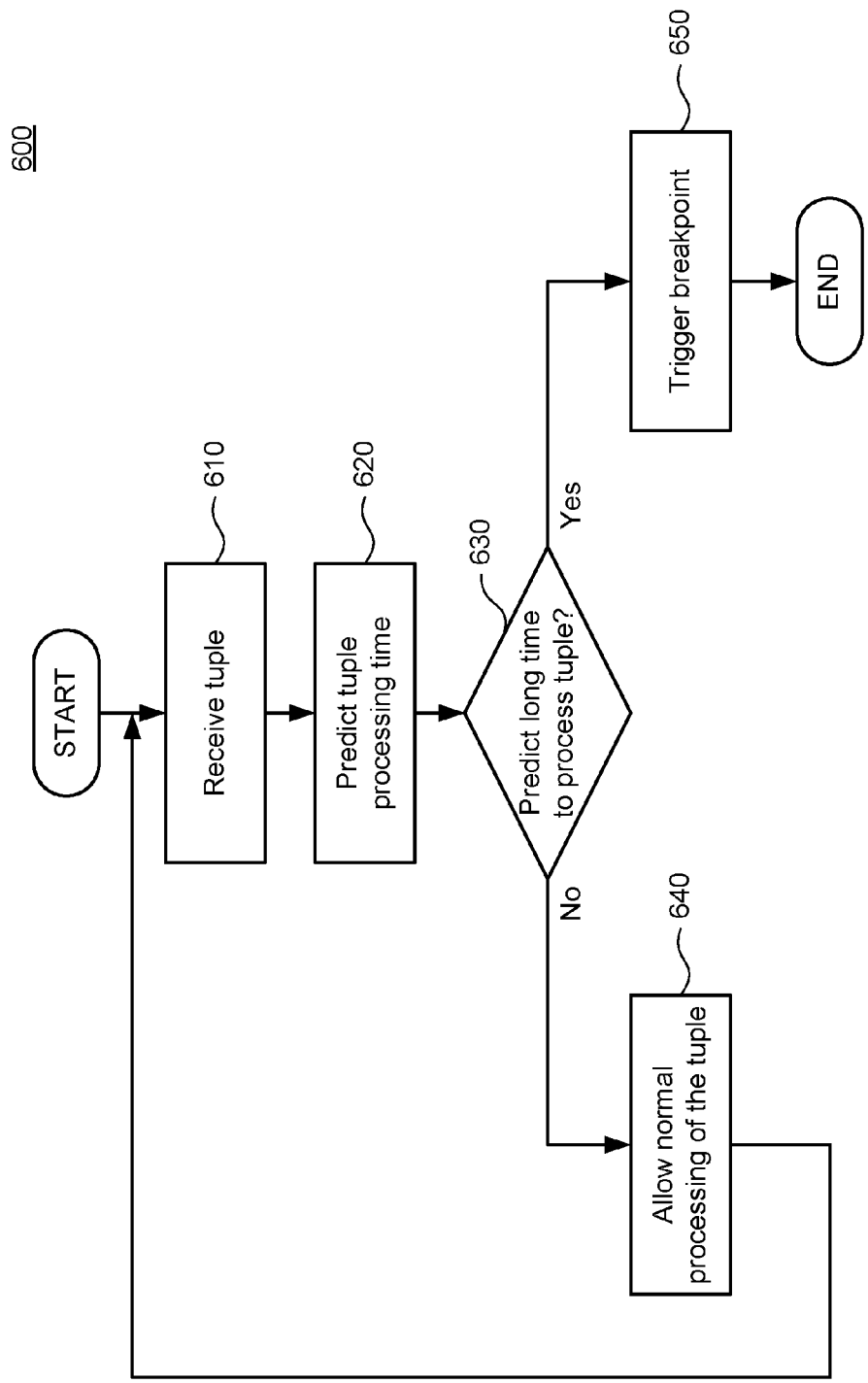
FIG. 6 illustrates a flow diagram of an example method for implementing a breakpoint configured to trigger when a tuple is predicted to take a long time to process.

FIG. 6 illustrates a flow diagram of an example method 600 for implementing a breakpoint configured to trigger when a tuple is predicted to take a long time to process. The method 600 may be initiated by a streams application manager when a user initiates a breakpoint through a developer environment.

At block 610, a tuple may be received by a stream operator. At block 620, the processing time for the tuple by the stream operator is predicted. The predicted processing time may be determined, as described herein, using a model developed based on processing times and attributes of previous tuples processed by the stream operator. At block 630, it is determined whether it is predicted that it will take a long time to process the tuple. For example, the determination may include comparing the predicted processing time to a threshold time, with a predicted time exceeding the threshold time resulting in a determination that it will take a long time to process the tuple. The threshold time may be a user-configurable time that is entered by a user through a debugger or IDE.

If it is predicted that the time to process the tuple is not a long time, the stream operator may process the tuple normally at block 640 and receive the next tuple at block 610. If it is predicted that it will take a long time to process the tuple, a breakpoint is triggered at block 650 to pause processing of the tuple by the stream operator and the method 600 ends. As described herein, triggering the breakpoint may further result in calling a debugger to allow a user to step through the stream operator code. As used herein stepping through the code or executing the code step-by-step may include executing the code one line at a time with a user controlling when the next line is executed.

Figure 7:
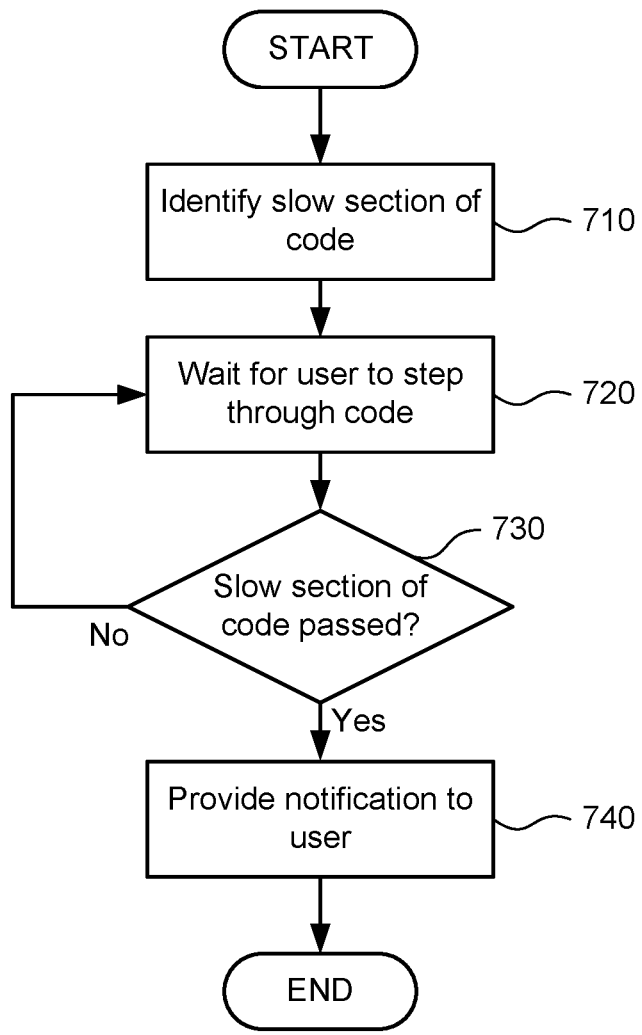
FIG. 7 depicts a flow diagram of an example method for notifying a user of a debugger when the user has passed the slow section of the stream operator code.

FIG. 7 depicts a flow diagram of an example method 700 for notifying a user of a debugger when the user has passed the slow section of the stream operator code. Method 700 may be initiated in response to a breakpoint being triggered based on predicting a long processing time for a tuple by a stream operator as described herein. For example, method 700 may begin in response to the triggering of the breakpoint at block 650 in FIG. 6. Method 700 may be performed, for example, by development system 102 as depicted in FIG. 1 and FIG. 4.

Method 700 begins with identifying the slow section of the stream operator code at block 710. The slow section of the code may be identified by profiling. A profiler tool may be used to identify the slow section of the code. The profiler tool may be part of a debugger, may be part of an IDE, or may be a distinct application. At block 720, the development system waits for the user to step through the stream operator code in a debugger. When the user steps through some of the stream operator code, the development system determines whether the slow section of the code has been passed at block 730. If the slow section of code has not been passed, the development system waits for the user to step through more code at block 720. If the slow section has been passed, the development system may provide a notification to the user that indicates the slow section of the code has been passed at block 740 and the method 700 ends. Providing the notification to the user may allow the user to determine that it is time to release the breakpoint and allow processing to continue.

Although the breakpoints have been described herein as relating to the processing time for a stream operator, the breakpoints could easily be implemented at the level of a processing element without departing from the scope of the present disclosure. For example, historical data may be gathered for time to process tuples by a given processing element (containing more than one operator). Code implementing a breakpoint may be run prior to the normal processing of a tuple when the tuple is received by the processing element, and the prediction for processing time could be based on the processing time for all stream operators within the processing element.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer program product for processing a stream of tuples, the computer program product comprising a non-transitory computer readable storage medium having program code embodied therewith, the program code executable by one or more processors to perform a method comprising:

receiving a stream of tuples to be processed by a plurality of processing elements operating on one or more computer processors, each processing element having one or more stream operators;

identifying a breakpoint for a first stream operator, the breakpoint configured to be triggered when time for processing of a tuple by the first stream operator is predicted to exceed a threshold time, the breakpoint set up through a debugger in an integrated development environment (IDE);

receiving, at the first stream operator, a first tuple having a set of attributes;

determining, using a model based on historical data, a predicted time to process the first tuple, the historical data including processing time, tuple attributes, and system performance characteristics for past processing of tuples at the first stream operator, the system performance characteristics including processor utilization;

determining the predicted time exceeds the threshold time;

triggering the breakpoint, in response to the determining the predicted time exceeds the threshold time, to pause processing of the tuple by the first stream operator;

providing, in response to the triggering the breakpoint, the debugger in the IDE for examining code for the first stream operator, wherein the debugger is configured to allow a user to step through execution of the code for the first stream operator;

determining a section of the code for the first stream operator that is exceeding the predicted time of execution, wherein the determining the section of the code is based on profiling using a profile tool in the IDE, wherein the IDE includes an optimizing compiler for optimization of the determined section of code;

notifying the user if said user has stepped past the section of code; and determining by the user, release of the breakpoint, and in response of releasing the breakpoint, unpause processing of the tuple by the first stream operator.

* * * * *